United States Patent [19]

Okura et al.

[11] Patent Number: 5,003,257
[45] Date of Patent: Mar. 26, 1991

[54] DIGITAL SPEEDOMETER DISPLAYING OF MEASURED OBJECT WITHOUT FLICKERING OF LEAST SIGNIFICANT DIGIT OF DISPLAYED VALUE

[75] Inventors: Kazuma Okura; Masahiro Ishikawa, both of Kanagawa, Japan

[73] Assignee: Nissan Motor Company, Ltd., Yokohama, Japan

[21] Appl. No.: 366,941

[22] Filed: Jun. 16, 1989

[30] Foreign Application Priority Data

Jun. 17, 1988 [JP] Japan ................................ 63-148325

[51] Int. Cl.$^5$ ............................ G01P 3/48; G01P 3/54
[52] U.S. Cl. .................................... 324/166; 364/565
[58] Field of Search ............... 324/160, 166, 168, 207, 324/208; 364/565, 566; 377/20, 23

[56] References Cited

U.S. PATENT DOCUMENTS

4,158,172  6/1979  Boyer et al. ....................... 324/166

FOREIGN PATENT DOCUMENTS

60-29069  7/1985  Japan .

*Primary Examiner*—Walter E. Snow
*Attorney, Agent, or Firm*—Pennie & Edmonds

[57] ABSTRACT

A digital speedometer includes a pulse counter, a timing pulse generator, an indicator register, a display, and a comparator for comparing the magnitude relationship between a counted value counted by the pulse counter and the memorized value of the indicator register, two counters in addition to the pulse counter, and a plurality of logic circuits. The comparator generates signals indicative of the magnitude relationship between the counted value and the memorized value. The two counters may output a first or second gate signal respectively to the AND gate connected to the indicator register, in response to the signals output from the comparator at a predetermined time cycle depending upon the gate time controlled by the timing pulse generator, in such a manner so as to renew the memorized value with the counted value only when the number of occurrences of the output of the first or second signals reaches a preset number thereof. The digital speedometer further comprises a decision circuit for renewing the memorized value with the counted value of the pulse counter only when the memorized value is 0, regardless of the number of occurrences of the output of the first or second signals counted by either of the two counters.

4 Claims, 3 Drawing Sheets

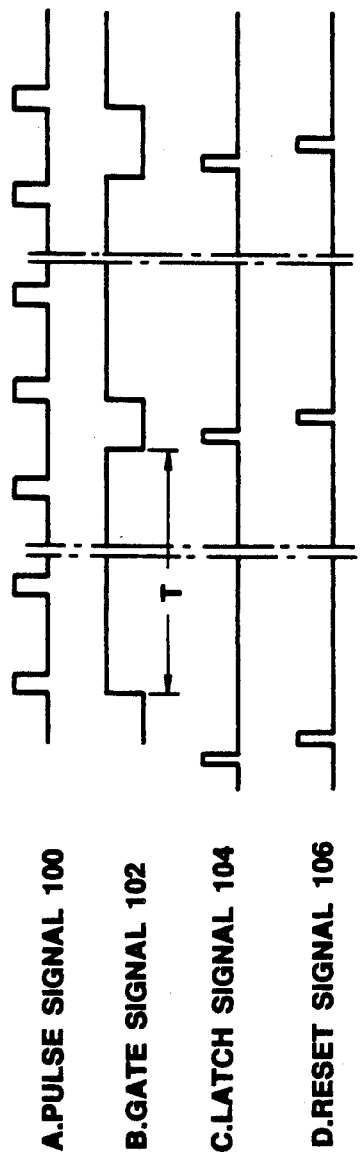

DIGITAL SPEEDOMETER DISPLAYING OF MEASURED OBJECT WITHOUT FLICKERING OF LEAST SIGNIFICANT DIGIT OF DISPLAYED VALUE

BACKGROUND OF THE INVENTION

1. Field of The Invention

The present invention relates to a digital speedometer used for measuring and displaying the velocity of a moving member or the rotational speed of a rotating member. Specifically to a digital speedometer for automotive vehicles applicable to display vehicle speed on the basis of a counted value of pulses generated from a pulse generator in proportion to the rotational speed of a measured object, such as a rotating propeller or wheel of a vehicle.

2. Description of The Prior Art

Recently, there have been proposed and developed various digital speedometers which include pulse generators, pulse counters, indicator registers, visual display means, and timing pulse generators. In such digital speedometers for automotive vehicles, a pulse generator is engaged with a measured object, such as a vehicle wheel in such a manner so as to generate pulses in proportion to the vehicle speed. A pulse counter counts the number of pulses from the pulse generator for a predetermined constant time interval controlled by the timing pulse generator. The timing pulse generator also outputs a latch signal in response to which the counted value of pulses is shifted into the indicator register at a time just after completion of the pulse counting and thus the counted value is memorized in the indicator register. Subsequently, the counted value indicative of the vehicle speed is immediately displayed on the visual display.

In this manner, since the digital speedometer is controlled by a timing pulse generator in such a manner that the number of pulses is counted for a predetermined constant time interval by the pulse counter and the counted value is subsequently displayed on the visual display. When the measured object is kept at an essentially constant speed, the least significant digit of the displayed value flickers frequently on the display due to slight changes in speed, thereby having a distracting effect on a vehicle occupant monitoring the display. For example, if the vehicle speed is kept at 60.5 km/h, an intermediate value between 60 km/h and 61 km/h, the speedometer displays alternately either 60 km/h or 61 km/h, each for a relatively short time due to slight fluctuations in vehicle speed.

To avoid this, a prior art digital speedometer for automotive vehicles with a hysteresis processing circuit wherein the memorized value of the indicator register is renewed with the newly counted value from the pulse counter only when the absolute value of the difference between the newly counted value and the memorized value exceeds a predetermined threshold value, has been disclosed in Japanese Patent Second Publication (Tokko) Showa 60-29069.

This hysteresis processing circuit for a digital speedometer is shown in FIG. 1 and its operation is described with reference thereto:

A subtracter 13 generates an output signal c indicative of the difference between an output signal a, indicative of the actual vehicle speed according to a vehicle speed pulse counter 11, and an indicator signal b indicative of a memorized value from an indicator register 12.

Then the output signal c from the subtracter 13 is input into the comparator 15. A digital setting circuit 14 wherein the hysteresis threshold value is set, also outputs a signal d indicative of the hysteresis value into the comparator 15. The comparator 15 compares the absolute value of the difference with the threshold value on the basis of the output signals c and d, and then the comparator 15 outputs a signal e into a logical multiply gate (AND gate) 16 only when the absolute value of the difference is greater than the above mentioned threshold value. Additionally, the AND gate receives a latch signal f generated from a timing pulse generator (not shown) at a time just after completion of each time cycle in which pulses are counted by the pulse counter 11. Therefore, when the latch signal 7 and the signal e are simultaneously input into the AND gate 16, the AND gate 16 is opened and as a result the counted value indicative of the actual vehicle speed is shifted from the pulse counter 11 to the indicator register 12 with the result that the memorized value of the register 12 is renewed.

As set forth above, the prior art hysteresis processing circuit for a digital speedometer for automotive vehicles requires a subtracter 13 and the comparator 15. In a vehicular digital speedometer, the visual display (not shown) must display a maximum vehicle speed of, for example, 200 km/h or more. Furthermore, the least significant digit of a displayed value and the resolution to which the vehicle speed is calculated is 1 km/h, as is generally known. For this reason, the subtracter 13 and the comparator 15 as well as the vehicle speed pulse counter 11 and the indicator register 12 must be of an 8 bit configuration or greater, thereby resulting in a relatively large digital circuit.

As described previously, if the least significant digit on the display and the resolution of the vehicle speed is 1 km/h, the hysteresis processing circuit 10 outputs signal e from the comparator 15 to the AND gate 16 only when the absolute value of the difference exceeds the threshold value of 1 km/h. That is to say, the absolute value must be greater than or equal to 2 km/h. As a result, the memorized value of the indicator register 12 is incremented or decremented by 2 km/h. In other words, the displayed value is changed in increments of ±2 km/h during acceleration or deceleration of the vehicle. In this construction, the performance required of a digital speedometer is not satisfied.

In order to overcome the above mentioned problem in the prior art digital speedometer with the hysteresis processing circuit, the resolution of the vehicle speed must be kept less than 1 km/h, for example 0.5 km/h. If the resolution of the vehicle speed and the threshold value of the setting circuit are set to 0.5 km/h and 1 km/h respectively, when the vehicle is gradually accelerated from 60 km/h, the counted value of the pulse counter 11 will be changed at the order of 60.5 km/h, 61 km/h, 61.5 km/h etc. . . . When the absolute value of the difference between the counted value of the pulse counter 11 and the memorized value of the indicator register 12 exceeds the threshold value of 1 km/h, that is to say, the counted value reaches to 61.5 km/h, the memorized value of 60 km/h is renewed with the counted value 61.5 km/h and then the display (not shown) displays 61 km/h because the least significant digit of the displayed value is incremented by 1 km/h.

In this manner, the displayed value of the digital speedometer 10 is incremented or decremented by 1 km/h during acceleration or deceleration. However, in prior art digital speedometers with a resolution of less than 1 km/h, a relatively large circuit construction is required for the pulse counter, subtracter, and comparator due to the increase in the number of digits computed by the pulse counter. In order to calculate vehicle speed at a higher resolution than 1 km/h, it is necessary that the number of pulses from the pulse generator be increased or that the time interval of the pulse counter be extended. However, an increase in the number of pulses results in a more expensive pulse generator. On the other hand, a longer time interval will decrease the responsiveness of the speedometer during acceleration and deceleration.

SUMMARY OF THE INVENTION

It is therefore, in view of the above disadvantages, an object of the invention to provide a digital speedometer with a compact circuit construction which can prevent the least significant digit of a displayed value from flickering across the minimum resolution due to slight variations in the speed of a measured object when the object is kept at an essentially constant speed.

It is another object of the invention to provide a digital speedometer with a simple circuit construction which provides optimum performance in response to changes in the speed of a measured object.

In order to accomplish the aforementioned and other objects, a digital speedometer including a pulse counter for counting a number of pulses generated from a pulse generator in proportion to the speed of a measured object for a controlled gate time, an indicator register for memorizing the counted value of the pulse counter, and a display for displaying the memorized value of the indicator register, comprises a comparator for comparing the magnitude relationship between the counted value and the memorized value at every elapse of the gate time cycle. The comparator generates a first signal indicating that the counted value is greater than the memorized value or a second signal indicating that the counted value is less than the memorized value. Means for respectively counting the number of occurrences of the output of the first and second signals are also provided, each signal being output from the comparator at a timing depending upon the controlled gate time. Also included is means for renewing the memorized value in the indicator register with the counted value of the pulse counter, operable only when the counting means receives the first or second signals concurrently for a preset number of time intervals each equalling the gate time.

According to another aspect of the invention, a digital speedometer including a pulse counter for counting a number of pulses generated from a pulse generator in proportion to the speed of a measured object for a controlled gate time, an indicator register for memorizing the counted value of the pulse counter, and a display for displaying the memorized value of the indicator register, comprises a comparator for comparing the magnitude relationship between the counted value and the memorized value at every elapse of the gate time cycle. The comparator generates a first signal indicating that the counted value is greater than the memorized value or a second signal indicating that the counted value is less than the memorized value. Also included are a first counter for counting the number of occurrences of the output of the first signal output from the comparator at a timing depending upon the controlled gate time and a second counter for counting the number of occurrences of the output of the second signal output from the comparator at a timing depending upon the controlled gate time plus; first means for renewing the memorized value in the indicator register with the counted value of the pulse counter only when the first or second counters count the number of occurrences of the output of the first or second signals concurrently for a preset number of time intervals each equalling the gate time and, second means for renewing the memorized value in the indicator register with the counted value of the pulse counter only when the memorized value is 0, regardless of the number of occurrences of the output of the first or second signals counted by the first or second counters.

According to a further aspect of the invention, a digital speedometer including a pulse counter for counting a number of pulses generated from a pulse generator in proportion to the speed of a measured object for a controlled gate time, an indicator register for memorizing the counted value of the pulse counter, and a display for displaying the memorized value of the indicator register, comprises a comparator for comparing the magnitude relationship between the counted value and the memorized value at every elapse of the gate time cycle. The comparator generates a first signal indicating that the counted value is greater than the memorized value, or a second signal indicating that the counted value is less than the memorized value or a third signal indicating that the counted value is equal to the memorized value. Further included are a first counter for counting the number of occurrences of the output of the first signal output from the comparator at a timing depending upon the controlled gate time such that the counted value of the first counter is reset by receiving the third signal and is incremented by receiving the first signal; a second counter for counting the number of occurrences of the output of the second signal output from the comparator at a timing depending upon the controlled gate time such that the counted value of the second counter is reset by receiving the third signal and is incremented by receiving the second signal; first means for renewing the memorized value in the indicator register with the counted value of the pulse counter only when the number of occurrences of the output of the first or second signals reach a preset number thereof, and second means for renewing the memorized value in the indicator register with the counted value of the pulse counter only when the memorized value is 0, regardless of the number of occurrences of the output of the first or second signals counted by the first or second counters.

BRIEF DESCRIPTION OF THE DRAWINGS

In the drawings:

FIG. 3 is a timing chart showing each signal output from or input to the timing pulse generator of the embodiment according to the invention shown in FIG. 2.

BEST MODE FOR CARRYING OUT THE INVENTION

Figure 1:
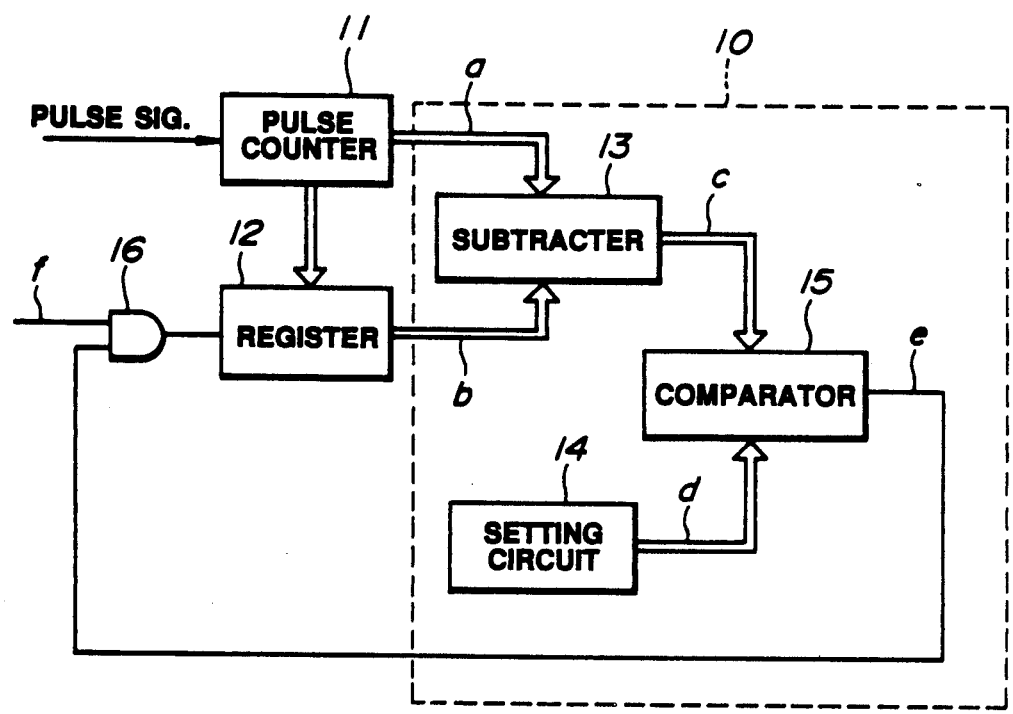
FIG. 1 is a block diagram illustrating the circuit components of a conventional digital speedometer with a hysteresis processing circuit.
Figure 2:
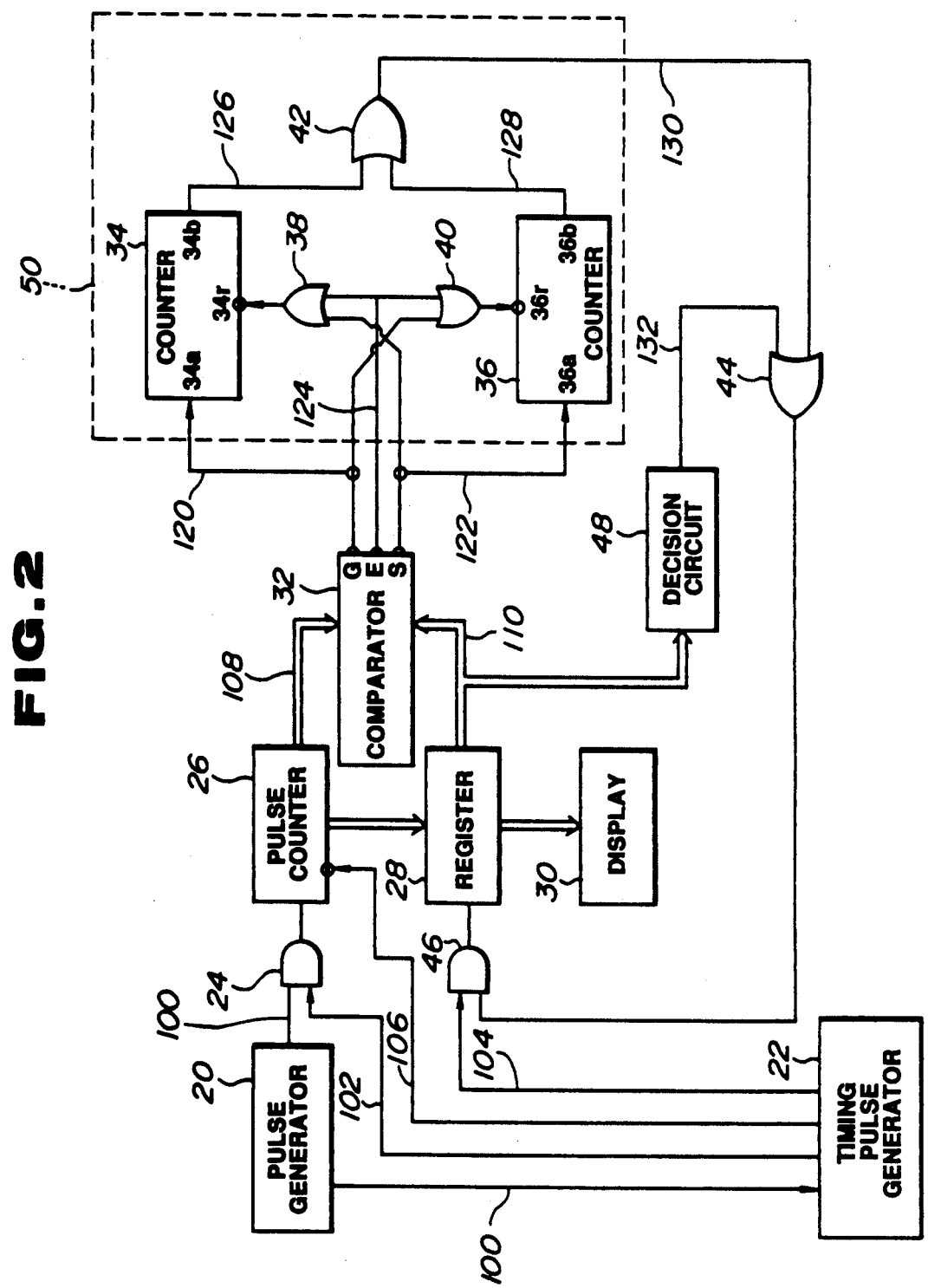
FIG. 2 is a block diagram illustrating a preferred embodiment of a digital speedometer according to the present invention.

Referring now to the drawings, particularly to FIG. 2, there is shown a digital speedometer including a compact circuit construction therefor according to the invention.

The pulse generator 20 generates pulses 100 in proportion to the speed of a measured object, such as the wheel of an automotive vehicle and then outputs the pulses 100 to a logical multiply gate (AND gate) 24 and a timing pulse generator 22 The AND gate 24 is opened for a predetermined gate time T when a gate signal 102 is output from the timing pulse generator 22 to the AND gate 24 in synchronization with the leading edge of the pulse signal generated from the pulse generator 20. Therefore, the pulses 100 are input to a pulse counter 26 for the predetermined time T and the pulse counter 26 counts the number of pulses 100 input during the time T. That is, the time T corresponds to a predetermined counting cycle representative of the time from the beginning of counting to the end of counting. An indicator register 28 memorizes the counted value in response to an output signal from the pulse counter 26. A visual display 30 displays the memorized value in response to an output signal from the indicator register 28. As is well known, the visual display 30 is comprised of an electronic element, such as a crystalline liquid, a light emitting diode, a fluorescent character display tube, a plasma display, or the like. The timing pulse generator 22 also outputs a reset signal 106 so as to reset the counted value of the pulse counter 26 to "0" after the time T has elapsed. The timing pulse generator 22 further outputs a latch signal 104 to another AND gate 46 connected to the indicator register 28. This latch signal is forwarded from the AND gate 46 to the indicator register 28 only when the value memorized by the indicator register 28 must be shifted to a new value at the completion of a gate time cycle T, the means for accomplishing this will be explained in the subsequent description of the functioning of the circuit 50. The pulse counter 26 and the indicator register 28 respectively output signals 108, indicative of the counted value, and 110 indicative of the current memorized value, to a comparator 32. The comparator 32 compares the magnitude relationship between the counted value and the memorized value after which operation the reset signal 106 from the timing pulse generator 22 is received by the pulse counter 26 thereby initiating a new cycle of the previously mentioned gate time T. The comparator 32 generates a binary output signal 120 from a terminal G thereof when the counted value is greater than the memorized value, a binary output signal 124 from a terminal E thereof when the counted value is equal to the memorized value, and a binary output signal 122 from a terminal S thereof when the counted value is less than the memorized value.

The essential circuit construction of the digital speedometer according to the invention is shown within the broken line in FIG. 2.

The above mentioned essential circuit 50 within the broken line in FIG. 2 is applied for renewing the memorized value of the indicator register 28 when either of the binary signals 120 or 122 is input to the circuit 50 from the comparator 32 according to the predetermined time cycle with a binary value of '1'. For this reason, the circuit 50 includes a first digital counter 34 which receives binary signal 120 and generates output signal 126 only upon receiving a signal of the binary value '1' concurrently for a preset number of time intervals each equalling the previously mentioned time T. For instance, should the preset number of time intervals be "2" then the counter must receive the binary signal '1' twice in a row (T×2) in order to produce output signal 126 and should a value of '0' be received for any number of time intervals no signal 126 will be produced. A second digital counter 36 is also provided which receives binary signal 122 and generates output signal 128 in the same way as specified above regarding the first digital counter.

In order to satisfy the function of the above mentioned circuit 50, the terminal G of the comparator 32 is connected to input terminal 34a of the first counter 34 and is also connected through a logical sum gate (OR gate) 40 to the reset terminal 36r of the second counter 36. The terminal S of the comparator 32 is connected to input terminal 36a of the second counter 36 and further connected through another OR gate 38 to reset terminal 34r of the first counter 34. The terminal E of the comparator 32 is connected through the two OR gates 38 and 40 to the two reset terminals 34r and 36r of the two counters respectively. Two output terminals 34b and 36b of the two counters 34 and 36 are connected through a third OR gate 42 to yet another OR gate 44 and from there to the AND gate 46. In this circuit construction, the OR gate 42 is activated when either of the output signals 126 or 128 is input thereto. Upon receiving either of these signals the OR gate 42 outputs signal 130 to OR gate 44.

As set forth above, the essential circuit 50 of the digital speedometer according to the invention is comprised of first and second digital counters 34 and 36 and the OR gates 38, 40, and 42.

The operation of the circuit 50 according to the invention is as follows:

When binary signal 120 is output from the terminal G of the comparator 32 to the input terminal 34a of the first counter 34, meaning that the counted value of the pulse counter 26 just before outputting the reset signal 106 was greater than the memorized value of the indicator register 28, the first counter 34 recognizes the binary value of the signal as being '0' or '1'. (In this embodiment a signal having a value of '0' will be ignored because if the value output from a given terminal, G for instance, is '0' the signal will not be acknowledged but rather a different signal with a value of '1' from another terminal, for example E or S, will be recognized.) The counter 34 also counts the number of time intervals T for which a signal with the value '1' is received When the counter 34 receives binary signal 120 with a value of '1' for the preset number of time intervals, for example T×2, it will then send an output signal 126 with a binary value of " to the OR gate 42. Simultaneously, since the comparator 32 also outputs binary signal 120 from the terminal G through the OR gate 40 to the reset terminal 36r of the second counter 36, the counted value of the second counter 36 is reset to "0".

Likewise, when the signal 122 is output from the terminal S of the comparator 32 to the input terminal 36a of the second counter 36 (that is, the counted value of the pulse counter 26 just before outputting the reset signal 106, was less than the memorized value of the indicator register 28), the counter 36 recognizes the binary value of the signal as being '0' or '1' and counts the number of time intervals T for which a signal with the value '1' is received. When the counter 36 receives binary signal 122 with a value of '1' for the preset number of time intervals, for example T×2, it will then send an output signal 128 with a binary value of '1' to the OR gate 42. Simultaneously, since the comparator 32 also outputs binary signal 122 from the terminal S through the OR gate 38 to the reset terminal 34r of the first counter 34, the counted value of the first counter 34 is reset to "0".

On the other hand, when the signal 124 is output from the terminal E of the comparator 32 through the two OR gates 38 and 40 into the two reset terminals 34r and 36r, respectively (that is, the counted value of the pulse counter 26 just before outputting the reset signal 106, was equal to the memorized value of the indicator register 28), the respective counted values of the first and second counters 34 and 36 are reset to "0".

As will be appreciated from the above, the two OR gates 38 and 40 prevent the two signals 126 and 128 from being input to the OR gate 42, simultaneously. The circuit 50 is designed in such a manner that only one of either signal 126 or 128 can be input to the OR gate 42 by means of the two OR gates 38 and 40. Accordingly, the OR gate 42 outputs a signal 130 representative of the logical sum of the outputs from the two counters 34 and 36 into the OR gate 44 when either of the signals 126 or 128 is input to OR gate 42. The signal 130 furthermore passes through the OR gate 44 to the AND gate 46. As previously described, the AND gate 46 receives the latch signal 104 from the timing pulse generator 22 at the completion of each gate time cycle T. In a case where the AND gate 46 receives the latch signal 104 and the logical sum signal 130 simultaneously, the AND gate 46 is opened and then the latch signal 104 is output through the AND gate 46 to the indicator register 28. At this time, the newly counted value of the pulse counter 26 is immediately shifted into the indicator register 28 and thus the counted value is memorized therein. In this manner, the memorized value of the indicator register 28 is reliably renewed only when the signal 130 is output from the circuit 50 to the AND gate 46. As seen from FIG. 2, the signal 130 functions as a gate open signal for the AND gate 46.

According to the timing chart of FIG. 3, the operation of the digital speedometer of the preferred embodiment will be hereinbelow described in detail:

FIG. 3A shows the pulses 100 which are output from the pulse generator 20 into the timing pulse generator 22. FIG. 3B shows the gate signal 102 which is comprised of binary signals '1' and '0' and which is kept '1' for the predetermined gate time cycle T in synchronization with the leading edge of the pulses 100 from the pulse generator 20. FIG. 3C shows the latch signal 104 which is comprised of the binary values '1' and '0' and which is momentarily kept '1' at the time when gate signal 102 changes state from '1' to '0'. FIG. 3D shows the reset signal 106 which is comprised of the binary values '1' and '0' and which is momentarily kept '1' just after the latch signal 104 changes state from '1' to '0' or just before the gate signal 102 initiates a new gate time cycle T by changing state from '0' to '1'.

The pulse signal 100 is simultaneously output to the AND gate 24 and to the timing pulse generator 22. As the timing pulse generator 22 receives the pulse signal 100 the gate signal 102 cyclically assumes a value of '1' for the period of the gate time cycle T to the AND gate 24 and therefore the AND gate 24 is opened in synchronization with the leading edge of a pulse of the pulse signal 100, as clearly seen in FIGS. 3A and 3B. The number of pulses contained in pulse signal 100 from the pulse generator 20 is counted by the pulse counter 26 only when the AND gate is opened for the period of time T in which the gate signal 102 maintains a value of '1'. The gate signal 102 becomes '0' the moment the gate time cycle T has elapsed and the AND gate 24 closes, thereby ending the pulse counting cycle. After this, the process is repeated, the gate signal 102 again becoming '1' in synchronization with the leading edge of another pulse from the pulse signal 100. In this manner, the gate signal alternately repeats '1' and '0' the transition to the '1' state always being in synchronization with the leading edges of pulses from the pulse signal 100. This synchronization prevents deterioration of counting accuracy due to drift in the gate open signal with respect to the leading edge of a pulse.

Essentially, the pulses 100, the latch signal 104, the reset signal 106, the signals 126 and 128, and the gate signal 130 are all continuously transmitted binary signals comprised of the values '1' and '0'. The output of these signals, as previously described, means that they assume a value of '1'. While in the '0' state they are inactive as concerns the present embodiment.

The timing pulse generator 22 outputs the latch signal 104 of the binary value '1' into the AND gate 46 as shown in FIG. 3C, just after the gate signal 102 has become '0'. In parallel with the above mentioned operation of the timing pulse generator 22, the circuit 50 of the embodiment outputs the gate signal 130 of the binary value '1' only when the first counter 34 or the second counter 36 are in a condition to produce signals 126 or 128 respectively according to the functioning of the circuit 50 previously described.

If the previously mentioned latch signal 104 of the binary value '1' is output from the timing pulse generator 22 to the AND gate 46, when the gate signal 130 of the binary value '1' is also present, the AND gate 46 is opened and an output signal of the binary value '1' is forwarded to the indicator register 28. As a result, the memorized value of the indicator register 28 is shifted or renewed to the newly counted value of the pulse counter 24, if the gate signal 130 is '0', the memorized value of the indicator register 28 is not renewed.

Subsequently, as shown in FIG. 3D, the timing pulse generator 22 outputs the reset signal 106 of the binary value '1' to the pulse counter 26 just after momentary output of the latch signal 104 of the binary value '1'. After the momentary output of the reset signal 106 of the binary value '1', the gate signal 102 from the timing pulse generator 22 again assumes the binary value '1' in synchronization with the leading edge of a pulse from the pulse signal 100, and then the next counting cycle begins.

As set forth above, the circuit 50 according to the invention can prevent the least significant digit of a displayed value on a visual display from flickering due to slight changes in speed across the minimum resolution thereof when the speed of a measured object is kept essentially constant. However, during acceleration or deceleration, a higher responsiveness is required for a digital speedometer, because the speed of a measured object changes rapidly. For example, during acceleration or deceleration from a certain constant speed, the signal 130 is output from the circuit 50 to the AND gate 46 to open the AND gate after one of the counters 34 or 36 has received a signal indicating a change in speed for two gate time cycles (T×2). That is to say, the circuit 50 requires two counting cycles of the gate time T for determining whether there are changes in speed. Hence, the memorized value of the indicator register 28 fails to follow the actual counted value of the pulse counter 26, or register the true speed of the measured object, satisfactorily. Particularly, when a measured object is rapidly accelerated from the stopped state (i.e., the memorized value of the indicator register 28 is "0"), the indicated speed on the display 30 will be roughly incremented, thereby causing anxiety in the vehicle operator. Therefore, when accelerating from a memorized value "0" (a speed of 0 km/h), a higher responsiveness is required of a digital speedometer.

For this reason, the digital speedometer of the preferred embodiment further includes a decision circuit 48 which is connected to the indicator register 28 and the OR gate 44. The decision circuit 48 monitors the signal 110 indicative of the memorized value of the indicator register 28 and outputs a signal 132 of the binary value '1' to the OR gate 44 only when the memorized value is "0". As a result, when the signal 132 is output from the decision circuit 48 to the OR gate 44, the OR gate 44 outputs a gate signal of the binary value '1' to the AND gate 46 regardless of the binary value of the signal 130 from the OR gate 42. As a result, the memorized value of the indicator register 28 is immediately renewed at the completion of every counting cycle of the gate time T. In this manner, a high responsiveness can be obtained when the measured object is rapidly accelerated from the memorized value "0".

According to the present invention, the digital speedometer normally operates such that the circuit 50 requires two cycles of the gate time T to determine whether to output a gate signal to the AND gate 46 for shifting the counted value from the pulse counter 26 to the indicator register 28, when there are changes in the speed of a measured object. Furthermore, the digital speedometer of the present invention operates such that the decision circuit 48 outputs another gate signal to the AND gate 46 also for shifting the counted value of the indicator register 28 only when the memorized value thereof is "0".

As will be appreciated from the above, in spite of the compact construction of the circuit, the digital speedometer of the invention can prevent the least significant digit of a displayed value on a display from flickering due to slight changes in speed across the minimum resolution thereof, when the speed of a measured object is kept essentially constant. Moreover, optimum responsiveness of the digital speedometer can be obtained during rapid acceleration from the stopped state of the measured object.

While the foregoing is a description of the best mode for carrying out the invention, it will be understood that the invention is not limited to the particular embodiment shown and described herein, but may include variations and modifications without departing from the scope or spirit of this invention as described by the following claims.

What is claimed is:

1. A digital speedometer including a pulse counter for counting a number of pulses generated from a pulse generator, said generated number being in proportion to the speed of a measured object during a controlled gate time, an indicator register for memorizing the counted value of said pulse counter, and a display for displaying the memorized value of said indicator register, comprising:

a comparator for comparing the magnitude relationship between said counted value and said memorized value, every elapse of said controlled gate time, said comparator generating a first signal indicative of said counted value being greater than said memorized value or a second signal indicative of said counted value being less than said memorized value;

means for respectively counting the number of occurrences of the output of said first and second signals, each being output from said comparator at a timing depending upon said controlled gate time;

first means for renewing said memorized value in said indicator register with said counted value of said pulse counter only when said counting means counts the number of occurrences of the output of said first or second signals concurrently for a preset number of time intervals each equalling the gate time; and second means for renewing said memorized value in said indicator register with said counted value of said pulse counter only when said memorized value is 0, regardless of the number of occurrences of the output of the first or second signals counted by said counting means.

2. A digital speedometer including a pulse counter for counting a number of pulses generated from a pulse generator, said generated number being in proportion to the speed of a measured object during a controlled gate time, an indicator register for memorizing the counted value of said pulse counter, and a display for displaying the memorized value of said indicator register, comprising:

a comparator for comparing the magnitude relationship between said counted value and said memorized value, every elapse of said controlled gate time, said comparator generating a first signal indicative of said counted value being greater than said memorized value or a second signal indicative of said counted value being less than said memorized value;

a first counter for counting the number of occurrences of the output of said first signal from said comparator at a timing depending upon said controlled gate time;

a second counter for counting the number of occurrences of the output of said second signal from said comparator at a timing depending upon said controlled gate time;

first means for renewing said memorized value in said indicator register with said counted value of said pulse counter only when said first or second counters count the number of occurrences of the output of said first or second signals concurrently for a preset number of time intervals each equalling said gate time; and second means for renewing said memorized value in said indicator register with said counted value of said pulse counter only when said memorized value is 0, regardless of the number of occurrences of the output of the first or second signals counted by said first or second counters.

3. A digital speedometer including a pulse counter for counting a number of pulses generated from a pulse generator, said generated number being in proportion to the speed of a measured object during a controlled gate time, an indicator register for memorizing the counted value of said pulse counter, and a display for displaying the memorized value of said indicator register, comprising:

- a comparator for comparing the magnitude relationship between said counted value and said memorized value, every elapse of said controlled gate time, said comparator generating a first signal indicative of said counted value being greater than said memorized value, or a second signal indicative of said counted value being less than said memorized value, or a third signal indicative of said counted value being equal to said memorized value;
- a first counter for counting the number of occurrences of the output of said first signal output from said comparator at a timing depending upon said controlled gate time such that the counted value of said first counter is reset by receiving said second or third signals and is incremented by receiving said first signal;
- a second counter for counting the number of occurrences of the output of said second signal output from said comparator at a timing depending upon said controlled gate time such that the counted value of said second counter is reset by receiving said first or third signals and is incremented by receiving said second signal;
- first means for renewing said memorized value in said indicator register with said counted value of said pulse counter only when the number of occurrences of the output of said first or second signals reaches a preset number thereof, and;
- second means for renewing said memorized value in said indicator register with said counted value of said pulse counter only when said memorized value is 0, regardless of the number of occurrences of the output of the first or second signals counted by said first or second counters.

4. A digital speedometer including a pulse counter for counting a number of pulses generated from a pulse generator, said generated number being in proportion to the speed of a measured object during a controlled gate time, and indicator register for memorizing the counted value of said pulse counter, and a display for displaying the memorized value of said indicator register, comprising:

- a comparator for comparing the magnitude relationship between said counted value and said memorized value, every elapse of said controlled gate time, said comparator generating a first signal indicative of said counted value being greater than said memorized value, or a second signal indicative of said counted value being less than said memorized value, or a third signal indicative of said counted value being equal to said memorized value;
- a first counter for counting the number of occurrences of the output of said first signal output from said comparator at a timing depending upon said controlled gate time such that the counted value of said first counter is reset by receiving said second or third signals and is incremented by receiving said first signal;
- a second counter for counting the number of occurrences of the output of said second signal output from said comparator at a timing depending upon said controlled gate time such that the counted value of said second counter is reset by receiving said first or third signals and is incremented by receiving said second signal;
- means for renewing said memorizing value in said indicator register with said counted value of said pulse counter when the number of occurrences of the output of said first or second signals reaches a preset number of time intervals each equalling said gate time; and
- a first OR gate for gating the second or third signals into a reset terminal of said first counter.

* * * * *